United States Patent
Evans et al.

(10) Patent No.: US 10,807,324 B2
(45) Date of Patent: Oct. 20, 2020

(54) APPARATUS AND METHOD FOR MANUFACTURING LIQUID MOLDED COMPOSITES USING A DISCRETE NETWORK OF TOOL SURFACE RESIN DISTRIBUTION GROOVES

(71) Applicant: The Boeing Company, Chicago, IL (US)

(72) Inventors: Paul D. Evans, Port Melbourne (AU); Max M Osborne, Port Melbourne (AU)

(73) Assignee: The Boeing Company, Chicago, IL (US)

( * ) Notice: Subject to any disclaimer, the term of this patent is extended or adjusted under 35 U.S.C. 154(b) by 44 days.

(21) Appl. No.: 16/054,106

(22) Filed: Aug. 3, 2018

(65) Prior Publication Data

US 2019/0152167 A1 May 23, 2019

Related U.S. Application Data

(63) Continuation-in-part of application No. 15/819,862, filed on Nov. 21, 2017.

(51) Int. Cl.
*B29C 70/48* (2006.01)
*B29C 70/44* (2006.01)
(Continued)

(52) U.S. Cl.
CPC ............ *B29C 70/48* (2013.01); *B29C 70/443* (2013.01); *B29C 70/543* (2013.01); *B29C 70/548* (2013.01); *B29C 33/60* (2013.01)

(58) Field of Classification Search
CPC ..... B29C 70/40; B29C 70/543; B29C 70/548; B29C 70/443; B29C 70/48
See application file for complete search history.

(56) References Cited

U.S. PATENT DOCUMENTS 6,406,659 B1  6/2002  Lang et al.
6,919,039 B2  7/2005  Lang et al.
(Continued)

FOREIGN PATENT DOCUMENTS

EP   1602470   12/2005
EP   1721719   11/2006
(Continued)

OTHER PUBLICATIONS

GCC Examination Report dated Feb. 20, 2020, issued in co-pending Arab States of the Gulf Patent Application No. GC 2018-36482.
(Continued)

*Primary Examiner* — William P Fletcher, III
(74) *Attorney, Agent, or Firm* — Joseph M. Rolnicki; Evans & Dixon, L.L.C.

(57) ABSTRACT

A tool and its method of use direct a flow of liquid resin through a preform. The tool has a tool surface with a channel recessed into the tool surface to a bottom surface of the channel. A plate is positioned on the tool surface covering over the channel with the plate being supported by the tool in the channel spaced above the bottom surface of the channel and with the top surface of the plate positioned coplanar with the tool surface of the tool. A preform is positioned on the tool surface with the preform covering over the plate. A flow of liquid resin is supplied to the tool surface and a pressure differential communicating with the tool surface draws the flow of liquid resin into the channel, through the channel and through a plurality of perforations through the plate and into the preform.

20 Claims, 15 Drawing Sheets

(51) Int. Cl.
*B29C 70/54* (2006.01)
*B29C 33/60* (2006.01)

(56) References Cited

U.S. PATENT DOCUMENTS

| | | | |
|---|---|---|---|
| 8,904,213 B2 | 12/2014 | Chan et al. | |
| 2008/0044506 A1 | 2/2008 | Zahlen et al. | |
| 2013/0280483 A1 | 10/2013 | Hayashi | |
| 2015/0102535 A1* | 4/2015 | Lutz | B29C 70/547 |
| | | | 264/553 |

FOREIGN PATENT DOCUMENTS

| | | | |
|---|---|---|---|
| EP | 3090863 | 11/2016 | |
| EP | 3090863 A1 * | 11/2016 | B29C 70/443 |
| GB | 2519160 | 4/2015 | |
| JP | 2001062932 | 3/2001 | |
| JP | 2004181627 | 7/2004 | |

OTHER PUBLICATIONS

Extended European Search Report dated May 14, 2019, issued in co-pending European Patent Application No. 18206115.0.
Extended European Search Report dated May 14, 2019, issued in co-pending European Patent Application No. 18201899.4.
David Inston, Plant tour: Spirit AeroSystems: Prestwick, Scotland, UK; CompositesWorld, Jan. 29, 2016.

* cited by examiner

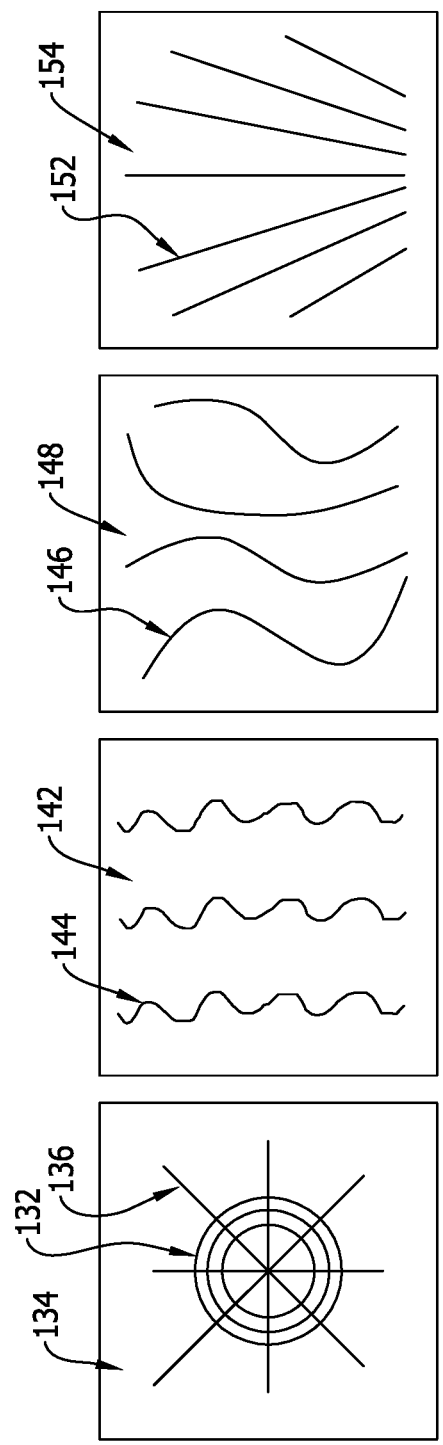

APPARATUS AND METHOD FOR MANUFACTURING LIQUID MOLDED COMPOSITES USING A DISCRETE NETWORK OF TOOL SURFACE RESIN DISTRIBUTION GROOVES

This patent application is a Continuation-In-Part of patent application Ser. No. 15/819,862, which was filed on Nov. 21, 2017, and is currently pending.

FIELD

This disclosure is directed to a tool and its method of use, where a plurality of grooves are cut or formed into the tool surface of the tool. The grooves have different cross-section dimensions, different lengths, different configurations and/or different patterns that function as tool surface resin distribution grooves. The grooves distribute and deliver resin supplied to the tool surface throughout a dry fiber composite layup positioned on the tool surface in resin infusion and resin transfer molding. The grooves are formed in the tool surface extending to discrete areas on the tool surface to direct a flow of liquid resin to the discrete areas and infuse the dry fiber composite layup with the liquid resin at those discrete areas of the tool surface.

BACKGROUND

In tool or tool surface resin distribution molding in forming fiber reinforced composite parts, dry fiber composite is laid up on the tool surface forming a preform on the tool surface.

In liquid molding, a fluid impervious sheet, a second tool (with or without grooves) or vacuum bag is then secured to the tool surface over the preform. The edges of the vacuum bag, or tool are sealed to the tool surface to form a sealed volume on the tool surface containing the preform.

A supply of liquid resin is then introduced into the sealed volume to wet the preform on the tool surface. A pressure differential is applied to the sealed volume, to draw the liquid resin across the preform and to infuse the liquid resin into the preform. Vacuum may be applied to create the pressure differential. The liquid resin is then cured, forming the fiber reinforced composite part.

To assist in the distribution of the liquid resin throughout the preform, resin distribution media are often positioned in the sealed volume between the vacuum bag and the tool surface. The resin distribution media is typically positioned on top of the preform and/or beneath the preform. The resin distribution media form pathways through which the liquid resin can flow when infusing the preform with the liquid resin. The resin distribution media thereby distribute the liquid resin entirely over the preform.

However, after curing of the fiber reinforced composite part, the resin distribution media must be removed from the part and discarded. Both the resin distribution media and any additional resin it contains are discarded. Thus, the use of resin distribution media to distribute liquid resin throughout the preform results in wasted resin.

Additionally, as the liquid distribution media is positioned on top of the preform, the fiber composite layup forming the preform can be altered. This could result in a fiber reinforced composite part not having the structural strength intended.

Still further, the use of resin distribution media on the preform to distribute liquid resin throughout the preform could result in the resin distribution media negatively affecting the surface of the fiber reinforced composite part being molded.

SUMMARY

The apparatus and its method of use of this disclosure provides targeted liquid resin distribution throughout an assembled dry fiber composite preform in resin infusion and resin transfer molding by using a discrete network of infusion grooves formed in a tool surface of a tool. The grooves are formed in the tool surface in predetermined patterns or configurations that extend from the resin source to discrete areas on the tool surface that would typically be difficult to reach by the liquid resin distributed over the tool surface.

The tool is used to supply resin into a dry fiber composite layup, or a preform using a pressure differential. In the method of using the tool, the preform is first positioned on a tool surface of the tool into which a plurality of grooves have been formed or machined. The plurality of grooves include several different patterns or configurations of grooves and different dimensions of grooves on the tool surface. The different patterns and different dimensions of the grooves are determined to optimize the delivery and distribution of liquid resin throughout the preform positioned on the tool surface. The preform is positioned on the tool surface covering over the plurality of grooves.

A fluid impervious sheet or tool or a vacuum bag is then positioned on the tool surface. The vacuum bag covers over the preform.

The fluid impervious sheet, tool or vacuum bag is then sealed to the tool surface over the preform and around the preform. This forms a sealed volume around the preform.

A flow of liquid resin is then supplied into the sealed volume. The flow of liquid resin may be introduced at one end of the tool surface, along one or more edges of the tool surface, or at discrete locations between the tool surface and the preform.

A pressure differential is also applied to the sealed volume to draw the liquid resin across the tool surface and through the preform.

The flow of liquid resin supplied into the sealed volume is directed through the preform by the pressure differential pulling the flow of resin through the grooves in the tool surface. The grooves in the tool surface direct the flow of liquid resin to targeted areas on the tool surface and assist in the distribution of the liquid resin throughout the preform.

The liquid resin is then cured in the preform, forming the fiber reinforced composite part.

The composite part is then removed from the tool surface of the tool. Any resin remaining in the grooves in the surface of the tool is then cleaned from the grooves.

In a variation of the above described apparatus and method, the grooves are formed as a channel in the tool surface of a tool. The channel is formed in the tool surface in a predetermined pattern or configuration with a length of the channel extending between opposite ends of the channel that are positioned at discrete areas on the tool surface. The location and size of the channel is determined to create a desired fill pattern and/or direct resin to the thickest regions of the part first.

A plate having substantially the same configuration as the channel is then positioned over the channel. The plate has a plurality of perforations through the plate. The perforations are dimensioned to allow a flow of resin from the channel and through the perforations. The perforations are dimensioned and designed to prevent fibers from distorting, i.e., the perforations are dimensioned small enough so that the fibers can bridge across each perforation without bending into the perforation.

With the plate in place over the channel, the preform is then positioned on the tool surface of the tool with the preform covering over the plate.

A fluid impervious sheet, or a second tool, or a vacuum bag is then positioned on the tool surface and over the preform.

The fluid impervious sheet, the second tool or the vacuum bag is then sealed to the tool surface, over the preform and around the preform and over the plate and channel. This forms a sealed volume around the preform and over the plate and channel.

A flow of liquid resin is then supplied into the sealed volume. The flow of liquid resin may be introduced at one end of the tool surface, along one or more edges of the tool surface at discrete locations between the tool surface and the preform, or the flow of liquid resin may be introduced into the channel.

A pressure differential is also applied to the sealed volume to draw the liquid resin into the channel, through the channel and the plurality of perforations in the plate, through the preform positioned on the plate and over the tool surface.

The flow of liquid resin supplied to the sealed volume is directed through the preform by the pressure differential pulling the flow of resin through the channel, through the plurality of perforations in the plate and through the preform. The channel directs the flow of liquid resin to targeted areas on the tool surface and assists in the distribution of the liquid resin throughout the preform while the plate with the plurality of perforations prevents fibers from the preform from distorting, with the perforations being dimensions small enough so that fibers of the preform can bridge across the perforations without bending into the perforations.

The resin on the tool surface and infused in the preform is then cured. The cured composite part is then removed from the tool surface of the tool. The plate is coated with a release agent prior to the flow of liquid resin being supplied into the sealed volume. The release agent enables the plate to be removed from the cured composite part together with any resin that has been cured in the channel.

As an alternative to coating the plate with a release agent, a film is laid over the tool surface and over the plate. The film has a plurality of perforations that match and align with the plurality of perforations through the plate. When the cured composite part is removed from the tool surface of the tool, the film with the perforations enables the composite part to be easily separated from the tool surface and from the plate.

In an alternative method, to assist in removing the composite part from the tool surface of the tool, an additional layer of a fluid impervious sheet may be placed on the tool surface and in the channel prior to the plate with the plurality of perforations being positioned in the channel and prior to the preform being positioned on the tool surface and on the plate.

The features, functions and advantages that have been discussed can be achieved independently in various embodiments or may be combined in yet other embodiments, further details of which can be seen with reference to the following description and drawings.

BRIEF DESCRIPTION OF THE DRAWINGS

FIGS. 10-13 are representations of plan views of tools having different patterns or configurations of grooves formed in their tool surfaces.

DETAILED DESCRIPTION

Figure 1:
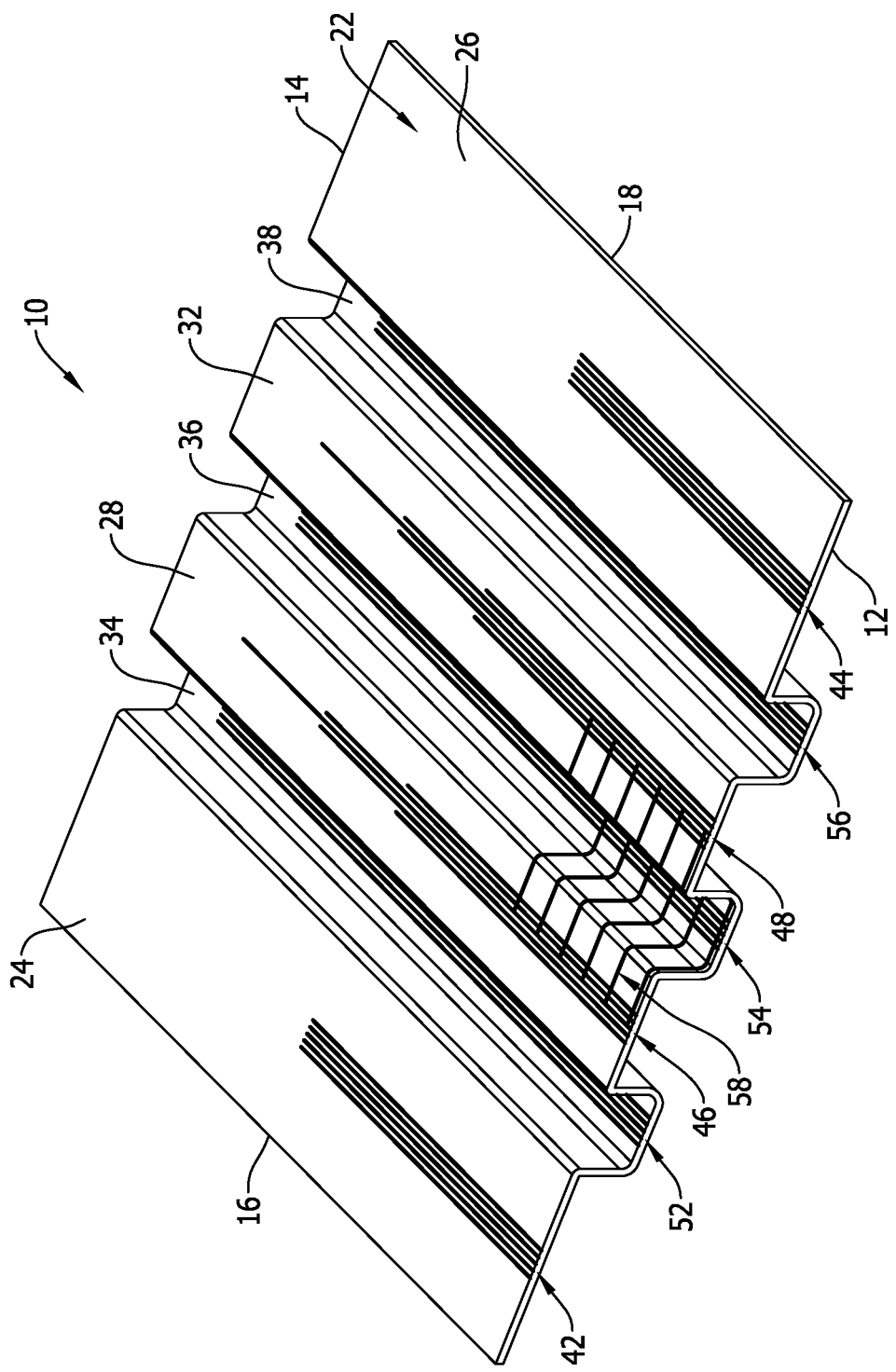
FIG. 1 is a representation of an isometric view of a first example of the tool of this disclosure.
Figure 2:
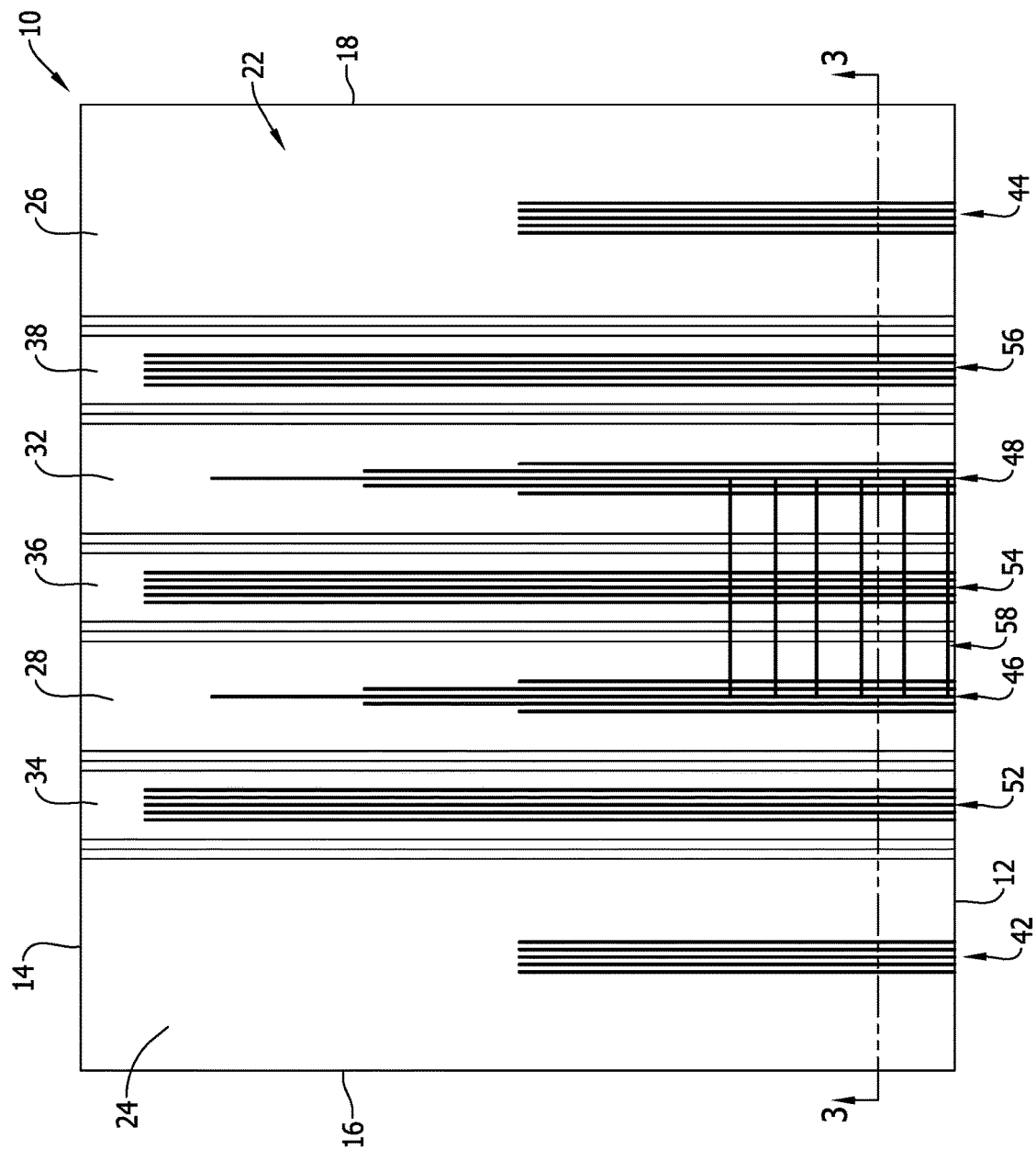
FIG. 2 is a representation of a plan view of the tool of FIG. 1.
Figure 3:
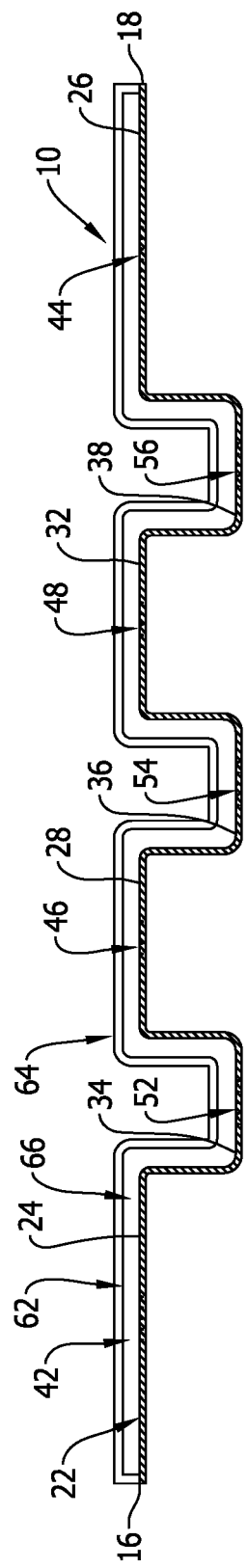
FIG. 3 is a representation of a cross-section view of the tool of FIG. 2.

FIGS. 1-3 are representations of a first example of a tool 10 used in practicing a method of directing a flow of liquid resin through a preform. As represented in FIGS. 1-3, the tool 10 has a general rectangular configuration defined by first 12 and second 14 opposite, parallel edges and third 16 and fourth 18 opposite, parallel edges. Although the tool 10 is represented as having a rectangular configuration in FIGS. 1-3, the tool could have other equivalent configurations. The four edges 12, 14, 16, 18 of the tool 10 extend around and form a periphery of a top surface or a tool surface 22 of the tool. As represented in FIGS. 1-3, the tool surface 22 of the tool 10 has four planar sections 24, 26, 28, 32 and three trough sections 34, 36, 38. The tool surface 22 could have various other, equivalent configurations, depending on the configuration of the composite part to be formed by the tool 10.

A first plurality of grooves 42 and a second plurality of grooves 44 are formed in the respective planar sections 24, 26 at the opposite sides of the tool surface 22. The first plurality of grooves 42 and the second plurality of grooves 44 are all straight, parallel grooves that extend across the respective planar sections 24, 26 of the tool surface 22 from the first edge 12 of the tool 10 toward the second edge 14, but stop about halfway across the tool surface 22. The first plurality of grooves 42 and the second plurality of grooves 44 are machined into the tool surface 22 or formed in the tool surface 22 by another equivalent means. The first plurality of grooves 42 and the second plurality of grooves 44 are arranged in basically the same configuration or pattern, and have substantially the same lengths. As represented in FIG. 3, the first plurality of grooves 42 and the second plurality of grooves 44 have substantially the same cross-section configurations. Although the cross-section configurations are represented as having a v-shape, the grooves could have other equivalent cross-section configurations such as rounded, square, etc.

A third plurality of grooves 46 and a fourth plurality of grooves 48 are formed in the respective planar sections 28, 32 in the middle of the tool surface 22. The third plurality of grooves 46 and the fourth plurality of grooves 48 are straight, parallel grooves that extend from the first edge 12 of the tool 10 toward the opposite second edge 14 of the tool, but stop short of the second edge 14. The third plurality of grooves 46 and the fourth plurality of grooves 48 are also machined into the tool surface 22 or formed in the tool surface 22 by other equivalent means. The third plurality of grooves 46 and the fourth plurality of grooves 48 are arranged in basically the same configurations or patterns, and include grooves having different lengths. Thus, the configuration or pattern of the third plurality of grooves 46 and the fourth plurality of grooves 48 is different from the configuration or pattern of the first plurality of grooves 42 and the second plurality of grooves 44. As represented in FIG. 3, the third plurality of grooves 46 and the fourth plurality of grooves 48 have substantially the same cross-section configurations.

A fifth plurality of grooves 52, a sixth plurality of grooves 54 and a seventh plurality of grooves 56 are also formed in the top surface 22. The fifth plurality of grooves 52, the sixth plurality of grooves 54 and the seventh plurality of grooves 58 extend across the tool surface 22 of the tool 10 at the bottoms of the three trough sections 34, 36, 38, respectively. The fifth plurality of grooves 52, the sixth plurality of grooves 54 and the seventh plurality of grooves 56 are all straight, parallel grooves that extend from the first edge 12 of the tool 10 toward the opposite second edge 14 of the tool, but end short of the second edge. Again, the grooves are machined into the tool surface 22 or formed in the tool surface 22 by other equivalent means. The grooves of the fifth plurality of grooves 52, the sixth plurality of grooves 54 and the seventh plurality of grooves 56 are all formed with the same lengths. However, the lengths of the grooves of the fifth plurality of grooves 52, the sixth plurality of grooves 54 and the seventh plurality of grooves 56 are all different from the lengths of the first plurality of grooves 42, the second plurality of grooves 44, the third plurality of grooves 46 and the fourth plurality of grooves 48. Thus, the pattern or configuration of the grooves of the fifth plurality of grooves 52, the sixth plurality of grooves 54 and the seventh plurality of grooves 56 are the same, but are different from the configurations or patterns of the first plurality of grooves 42, the second plurality of grooves 44, the third plurality of grooves 46 and the fourth plurality of grooves 48. As represented in FIG. 3, the fifth plurality of grooves 52, the sixth plurality of grooves 54 and the seventh plurality of grooves 56 have substantially the same cross-section configuration.

An eighth plurality of grooves 58 is also formed in the tool surface 22. As represented in FIGS. 1 and 2, the eighth plurality of grooves 58 is formed in the tool surface 22 perpendicular to the first, second, third, fourth, fifth, sixth and seventh pluralities of grooves. The eighth plurality of grooves 58 are all straight, parallel grooves that extend across some of the third 46 and fourth 48 pluralities of grooves on the respective third 28 and fourth 32 planar sections of the tool surface 22, and extend across the sixth plurality of grooves 54 in the trough section 36 at the center of the tool surface 22. Thus, the eighth plurality of grooves 58 communicate some of the third 46 and fourth 48 pluralities of grooves with the sixth plurality of grooves 54 at the center of the tool surface 22. The grooves of the eighth plurality of grooves 58 are spaced further from each other than the first, second, third, fourth, fifth, sixth and seventh pluralities of grooves. Additionally, the grooves of the eighth plurality of grooves 58 are wider than the grooves of the first, second, third, fourth, fifth, sixth and seventh pluralities of grooves, and therefore have a larger cross-section configuration.

Figure 4:
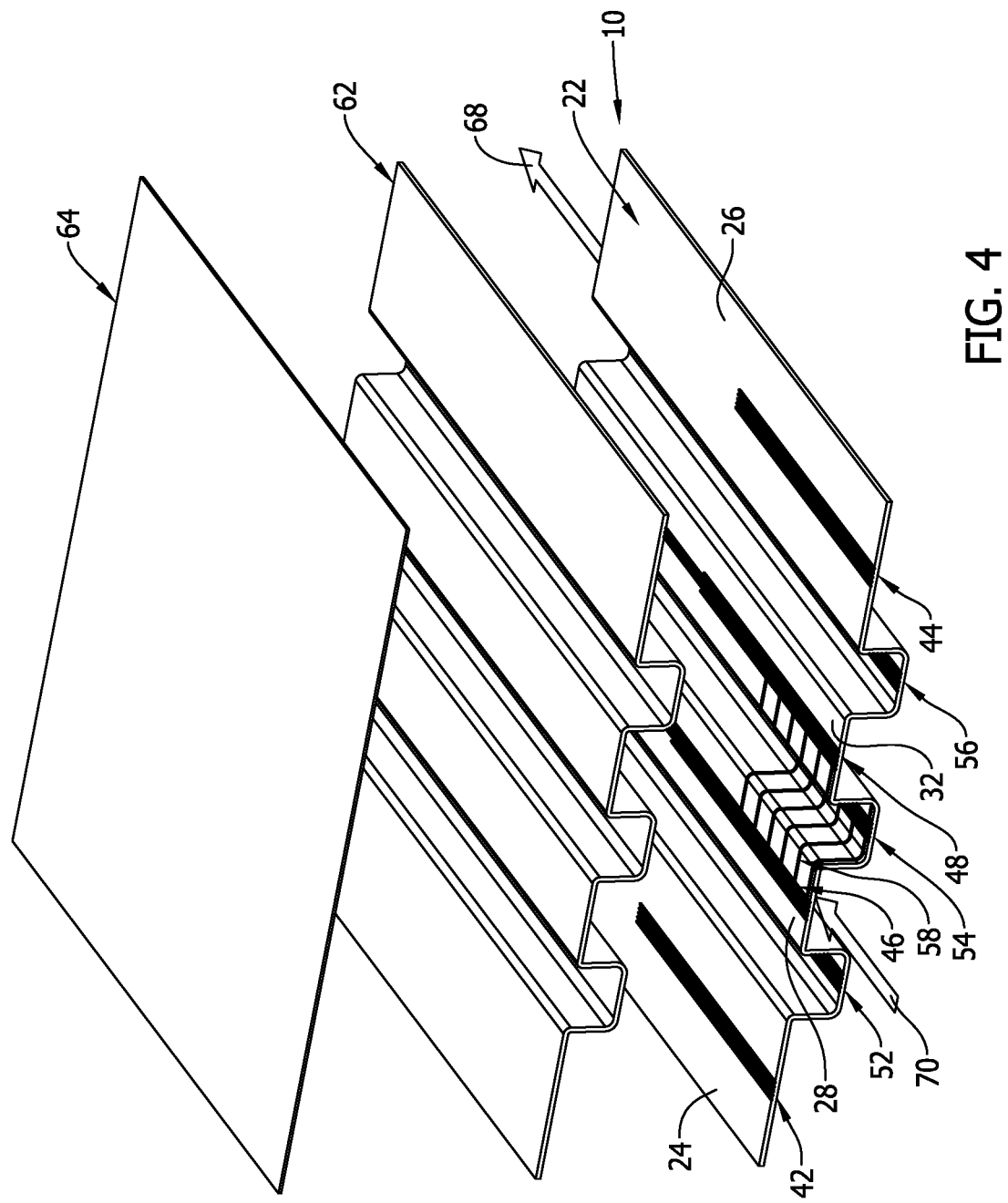
FIG. 4 is a representation of an isometric view of the tool of FIG. 1 with a dry fiber composite preform and a vacuum bag in preparing the tool of FIG. 1 for infusing liquid resin through the preform using the pressure differential.

FIG. 4 is a representation of the method of using the tool 10 in manufacturing a fiber reinforced composite part in resin infusion and resin transfer molding. In the method represented in FIG. 4, a dry fiber composite preform 62 is positioned on the tool surface 22 of the tool 10. The preform 62 is positioned over the pluralities of grooves 42, 44, 46, 48, 52, 54, 56, 58 formed in the tool surface 22. In the example represented in FIG. 4, the preform 62 has a configuration that closely follows the configuration of the tool surface 22. However, the preform 62 could have other configurations different from the configuration of the tool surface 22.

A fluid impervious sheet 64, or second tool or vacuum bag 64 is then positioned on the tool surface 22. The vacuum bag 64 covers over the preform 62. The perimeter of the vacuum bag 64 is sealed to the tool surface 22 over the preform 62 and around the preform. This forms a sealed volume 66 between the vacuum bag 64 and the tool surface 22 that is occupied only by the preform 62. If resin distribution media is used elsewhere in the sealed volume 66, it is not present on the grooves 42, 44, 46, 48, 52, 54, 56, 58 or between the grooves and the preform 62. The grooves 42, 44, 46, 48, 52, 54, 56, 58 enable the use of resin distribution media to be significantly reduced. This is represented in FIG. 3.

A pressure differential 68 is applied to the sealed volume 66. The pressure differential 68 is represented schematically in FIG. 4. The pressure differential 68 can be introduced to the tool surface 22 and applied into the sealed volume 66 in any conventional manner. The pressure differential 68 applied to the sealed volume 66 between the vacuum bag 64 and the tool surface 22 draws the vacuum bag 64 down onto the preform 62 and infuses liquid resin into the preform 62.

A flow of liquid resin 70 is then supplied to the tool surface 22 and into the sealed volume 66. The flow of liquid resin 70 is represented schematically in FIG. 4. The flow of liquid resin 70 can be supplied to the tool surface 22 in any conventional manner. Although the flow of liquid resin 70 is represented as being supplied to the first edge 12 of the tool surface 22, toward the center of the first edge 12, the flow of liquid resin 70 could be supplied to the tool surface 22 at some other location around the tool surface. For example, the flow of liquid resin 70 could be introduced at one or more edges of the tool surface 22, or at discrete locations between the tool surface 22 and the preform 62.

Figure 5:
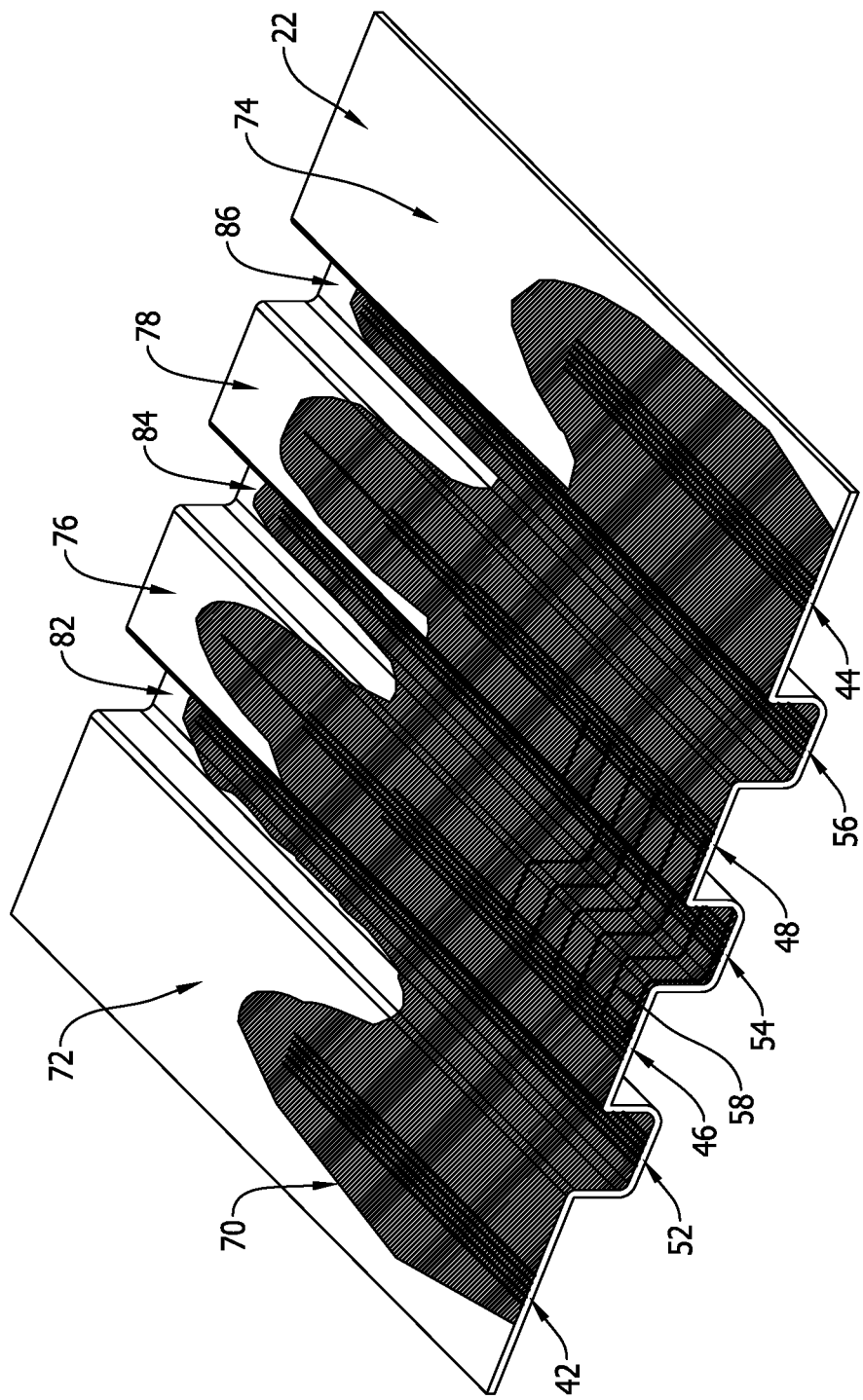
FIG. 5 is a representation of an isometric view of liquid resin being drawn across the tool surface of the tool of FIG. 1 using the pressure differential.

FIG. 5 is a representation of how the flow of liquid resin 70 supplied into the sealed volume 66 is directed across the tool surface 22 and through the perform 62 by the vacuum pressure pulling the flow of liquid resin through the grooves 42, 44, 46, 48, 52, 54, 56, 58 in the tool surface 22. The grooves 42, 44, 46, 48, 52, 54, 56 direct the flow of liquid resin 70 to targeted areas or discrete areas 72, 74, 76, 78, 82, 84, 86, respectively, on the tool surface 22. A first portion of the flow of liquid resin 70 is directed to the first discrete area 72 on the tool surface 22 through the first group of grooves 42. A second portion of the flow of liquid resin 70 is directed to the second discrete area 74 on the tool surface 22 through the second group of grooves 44. A third portion of the flow of liquid resin 70 is directed to the third discrete area 76 on the tool surface 22 through the third group of grooves 46. A fourth portion of the flow of liquid resin 70 is directed to the fourth discrete area 78 on the tool surface 22 through the fourth group of grooves 48. A fifth portion of the flow of liquid resin 70 is directed to a fifth discrete area 82 on the tool surface 22 through the fifth group of grooves 52. A sixth portion of the flow of liquid resin 70 is directed to the sixth discrete area 84 on the tool surface 22 through the sixth group of grooves 54. A seventh portion of the flow of liquid resin 70 is directed to the seventh discrete area 86 on the tool surface 22 through the seventh group of grooves 56. In this manner, the grooves 42, 44, 46, 48, 52, 54, 56 assist in the distribution of the liquid resin 70 throughout the preform 62.

Different volumes of the flow of liquid resin 70 can be supplied to the discrete areas 72, 74, 76, 78, 82, 84, 86 through grooves having different cross-section dimensions, different length dimensions and different configurations or patterns.

The liquid resin is then cured in the preform, forming the fiber reinforced composite part.

The composite part is then removed from the tool surface 22. Any cured resin remaining in the grooves 42, 44, 46, 48, 52, 54, 56, 58 in the tool surface 22 can then be removed from the grooves.

The patterns or configurations of the plurality of grooves 42, 44, 46, 48, 52, 54, 56, 58 represented in FIGS. 1-5 are not the only patterns or configurations of grooves that could be used in practicing the method of delivering and distributing liquid resin supplied to a tool surface throughout a dry fiber composite layup positioned on the tool surface in resin infusion and resin transfer molding. FIGS. 6-9 represent another example of liquid resin distribution grooves formed in a tool surface of a tool. The grooves of FIGS. 6-9 are formed in the same manner as those of FIGS. 1-3. The tool 90 of FIGS. 6-9 also has a general rectangular configuration similar to the tool 10 of FIGS. 1-5. However, the tool 90 could have other configurations. The tool 90 has a tool surface 92 with four planar sections 94, 96, 98, 102 and three trough sections 104, 106, 108. However, the tool surface 92 could have other configurations depending on the fiber reinforced composite part to be produced by the tool. The plurality of grooves formed in the tool surface 92 of FIGS. 6-9 include grooves 112, 114 formed in the respective outer planar sections 94, 96 of the tool surface 92. These grooves 112, 114 have substantially the same configurations or patterns with the grooves extending parallel and straight across the tool surface 92, but not completely across the tool surface.

The pluralities of grooves also include pluralities of grooves 116, 118, 122 that extend across the respective trough sections 104, 106, 108 of the tool surface 92. These pluralities of grooves 116, 118, 122 also have the same configurations or patterns, with the grooves being parallel and straight and extending across almost the entire lengths of the trough sections 104, 106, 108.

A further plurality of grooves 124 extend perpendicular to the other pluralities of grooves 112, 114, 116, 118, 122 and intersect with and communicate with grooves of the three pluralities of grooves 116, 118, 122 in the trough sections 104, 106, 108.

Figure 6:
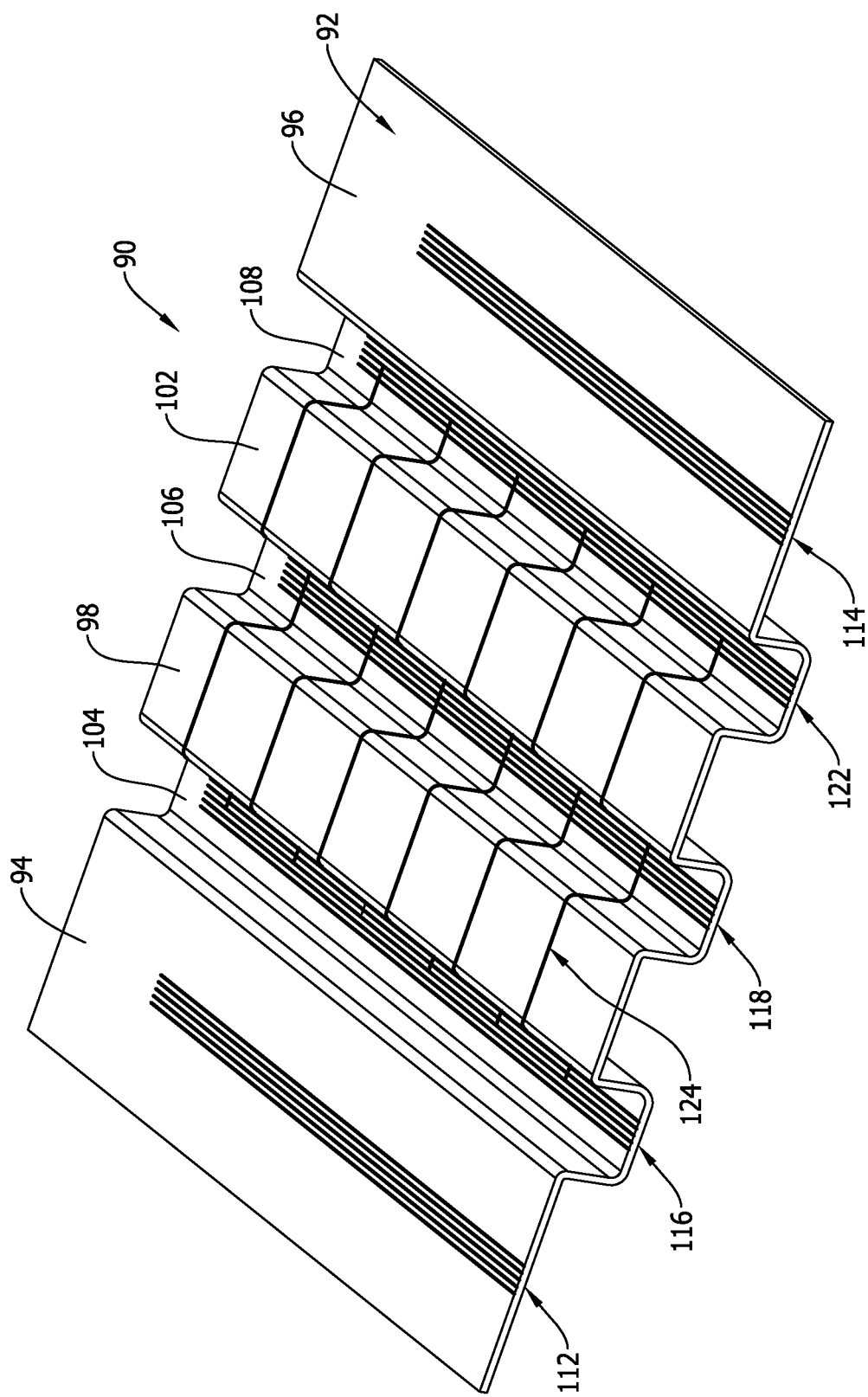
FIG. 6 is a representation of an isometric view of a second example of the tool of this disclosure.
Figure 7:
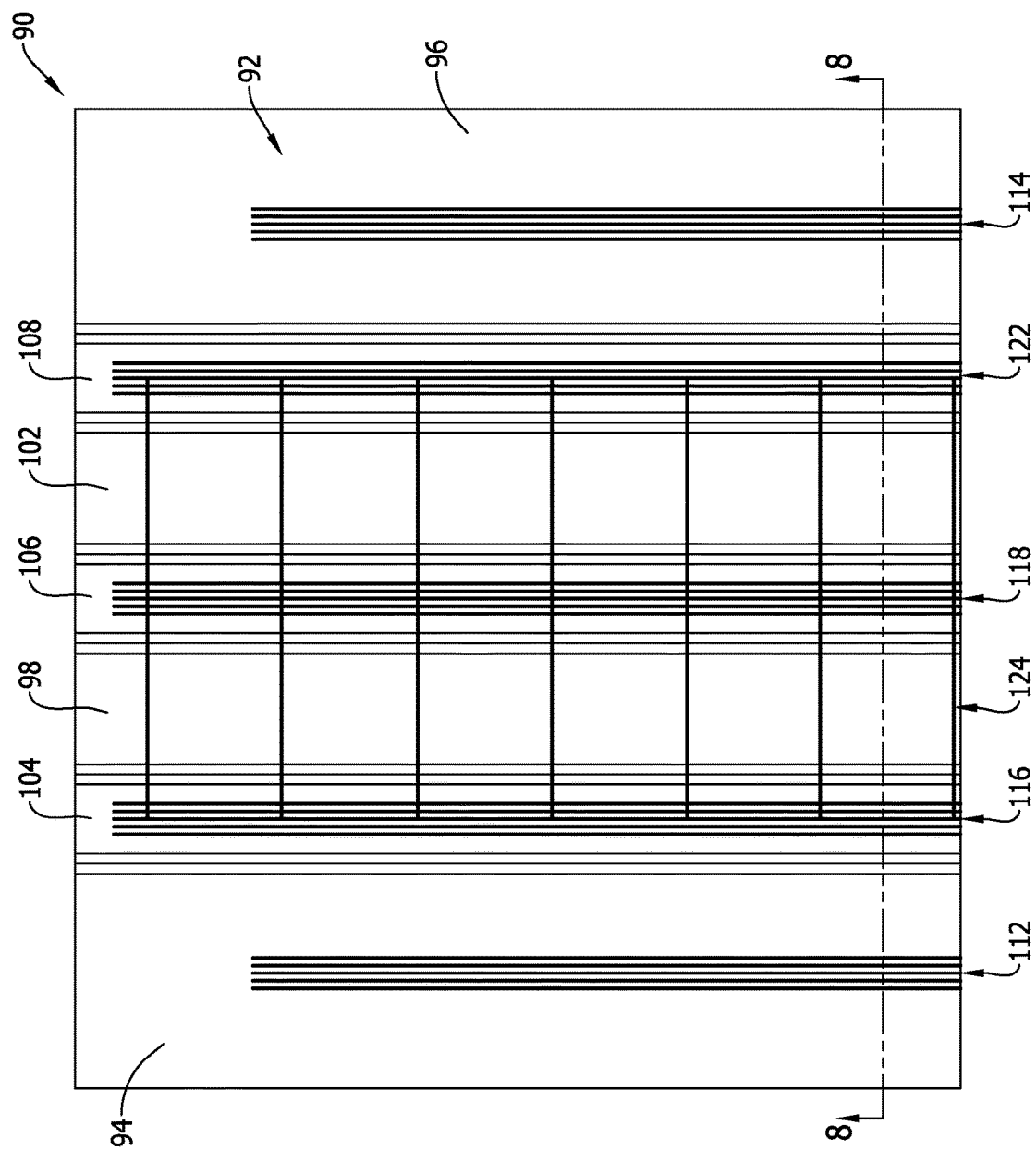
FIG. 7 is a representation of a plan view of the tool of FIG. 6.
Figure 8:
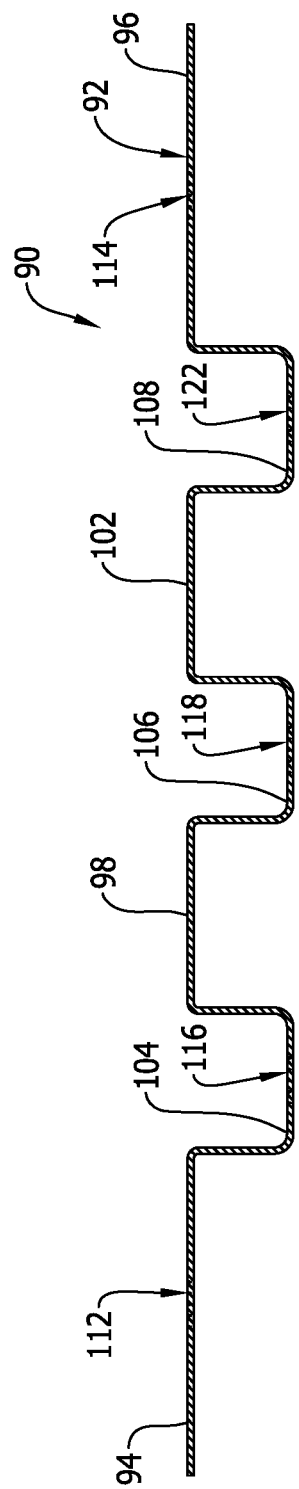
FIG. 8 is a representation of a cross-section view of the tool along the line 8-8 of FIG. 7.
Figure 9:
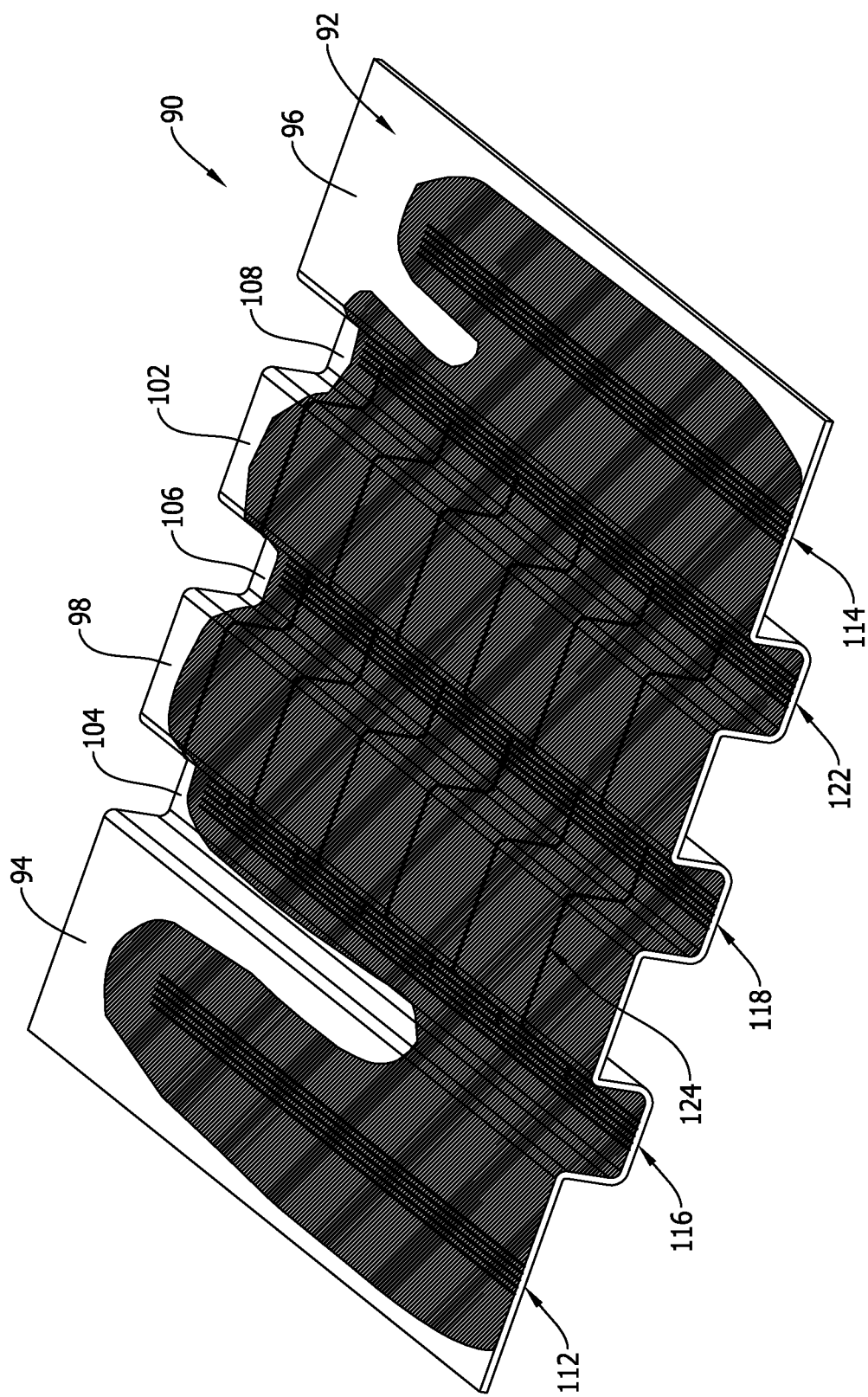
FIG. 9 is a representation of liquid resin being drawn across the tool surface of the tool of FIG. 6 using the pressure differential.
Figure 14:
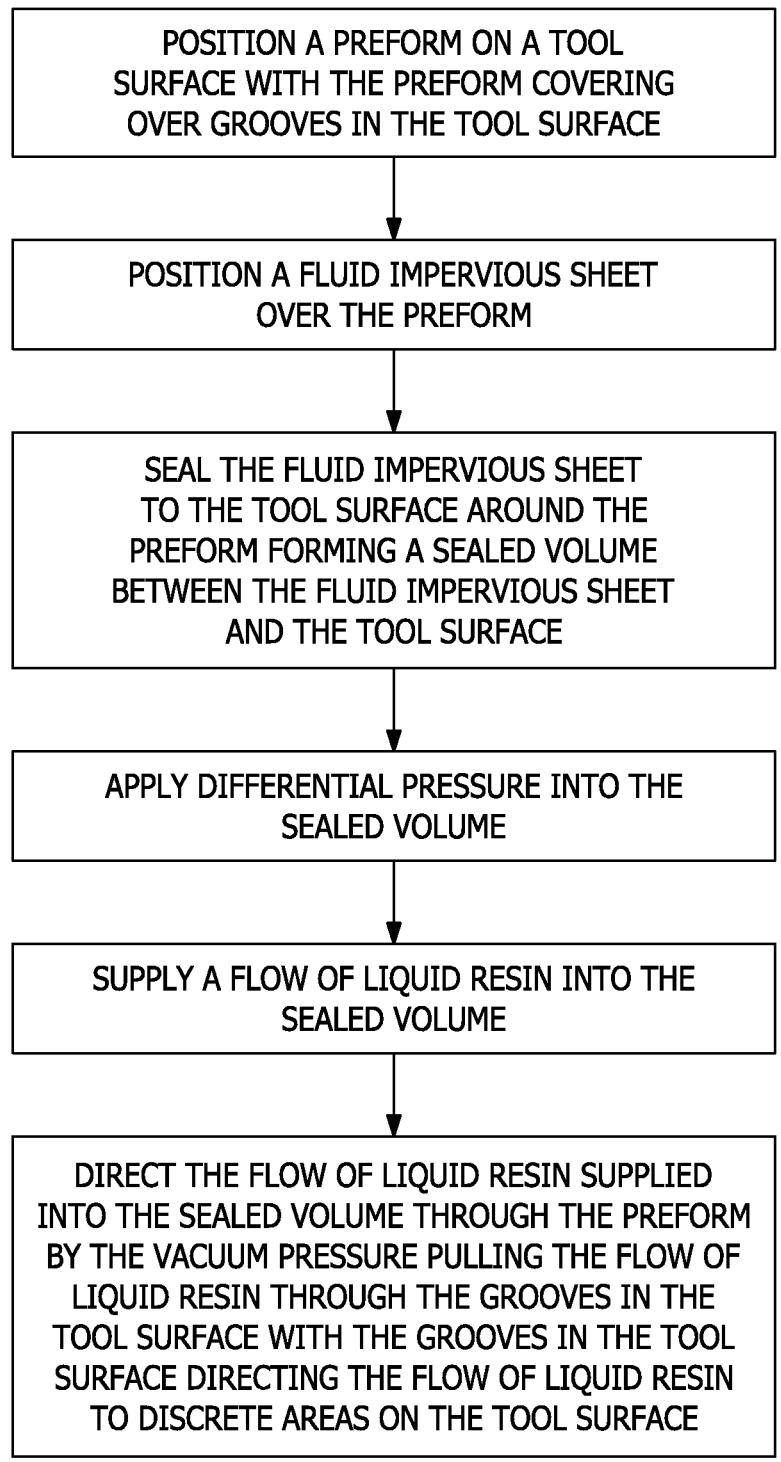
FIG. 14 is a flow chart of a method of this disclosure.

The representations of the grooves in FIGS. 6-8 show that the grooves in the tool surface can have various different configurations that best suit the grooves for directing and delivering liquid resin across the tool surface to discrete areas on the tool surface in basically the same manner as described earlier with reference to FIGS. 1-5. The pattern of the grooves eliminates the need for resin distribution media on the tool surface.

FIGS. 10-13 represent other possible configurations or patterns of grooves formed into a tool surface of a tool to assist in the distribution and delivery of liquid resin across the tool surface and into a preform on the tool surface without the need for resin distribution media.

FIG. 10 represents a first pattern of grooves 132 in the tool surface 134 and a second pattern of grooves 136 in the tool surface. As represented in FIG. 10, the first configuration or pattern of grooves 132 is comprised of circular, concentric grooves and the second configuration or pattern of grooves 136 is comprised of straight grooves that radiate outwardly from a center of the tool surface 134.

FIG. 11 represents a tool surface 142 having pluralities of grooves 144 formed in the tool surface. The pattern or configuration of the plurality of grooves 144 represented in FIG. 11 includes grooves that extend across the tool surface 142 with there being multiple tight bends or curves in the grooves 144.

The plurality of grooves 146 in the tool surface 148 of the tool represented in FIG. 12 includes a plurality of grooves with large bends or curves that extend across the tool surface.

The plurality of grooves 152 in the tool surface 154 of the tool of FIG. 13 includes grooves 152 that extend straight across the tool surface 154 and spread across the tool surface as they extend across the tool surface.

Thus, as represented in the drawing figures, the pluralities of grooves formed in the tool surface can have a variety of different configurations or patterns, different lengths and different dimensions that best suit the grooves for delivering and distributing liquid resin across the tool surface and into a preform positioned on the tool surface without the need for resin distribution media.

Figure 15:
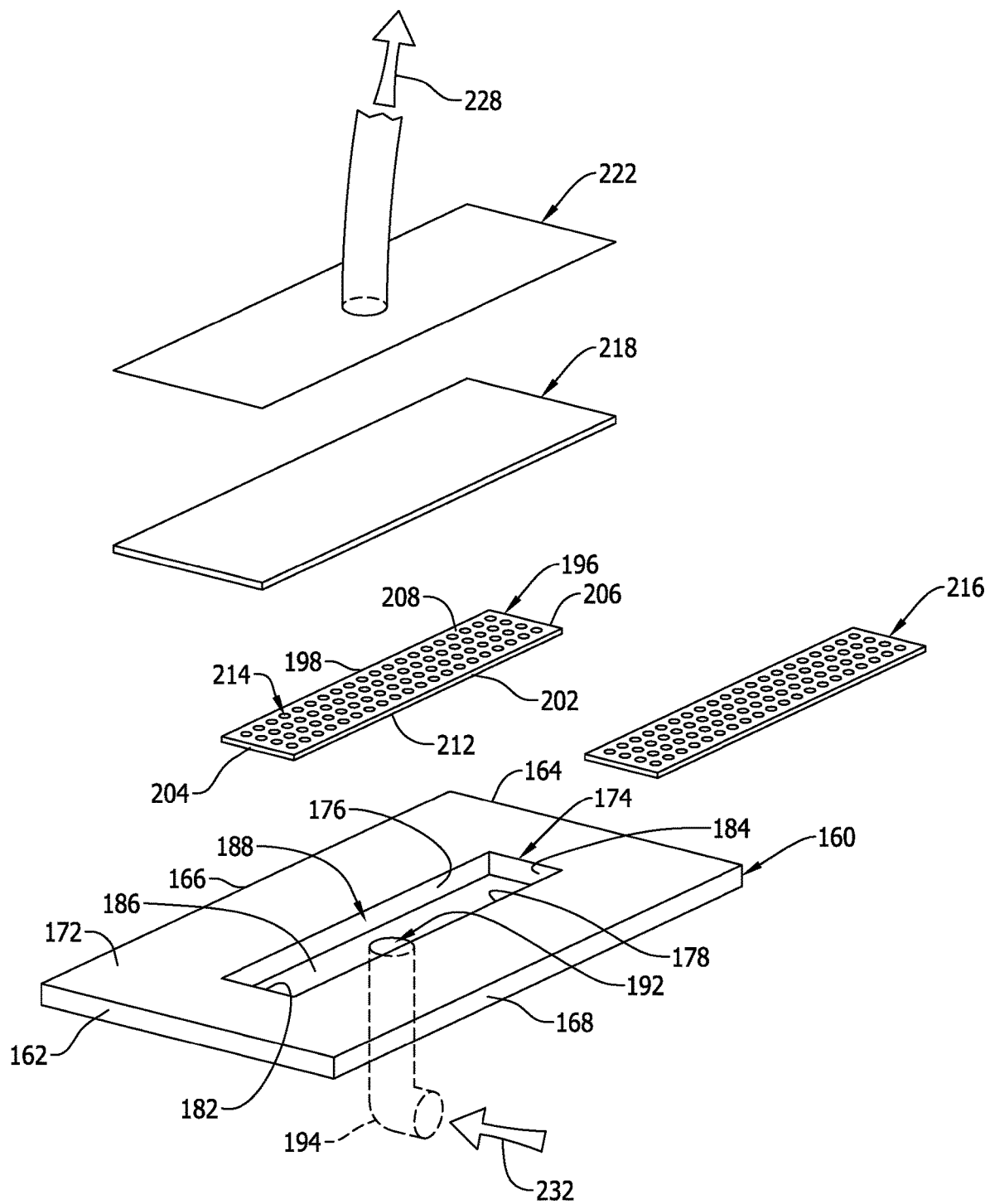
FIG. 15 is a representation of an isometric view of a further example of the tool of this disclosure, with the tool having a channel formed in a tool surface of the tool.
Figure 16:
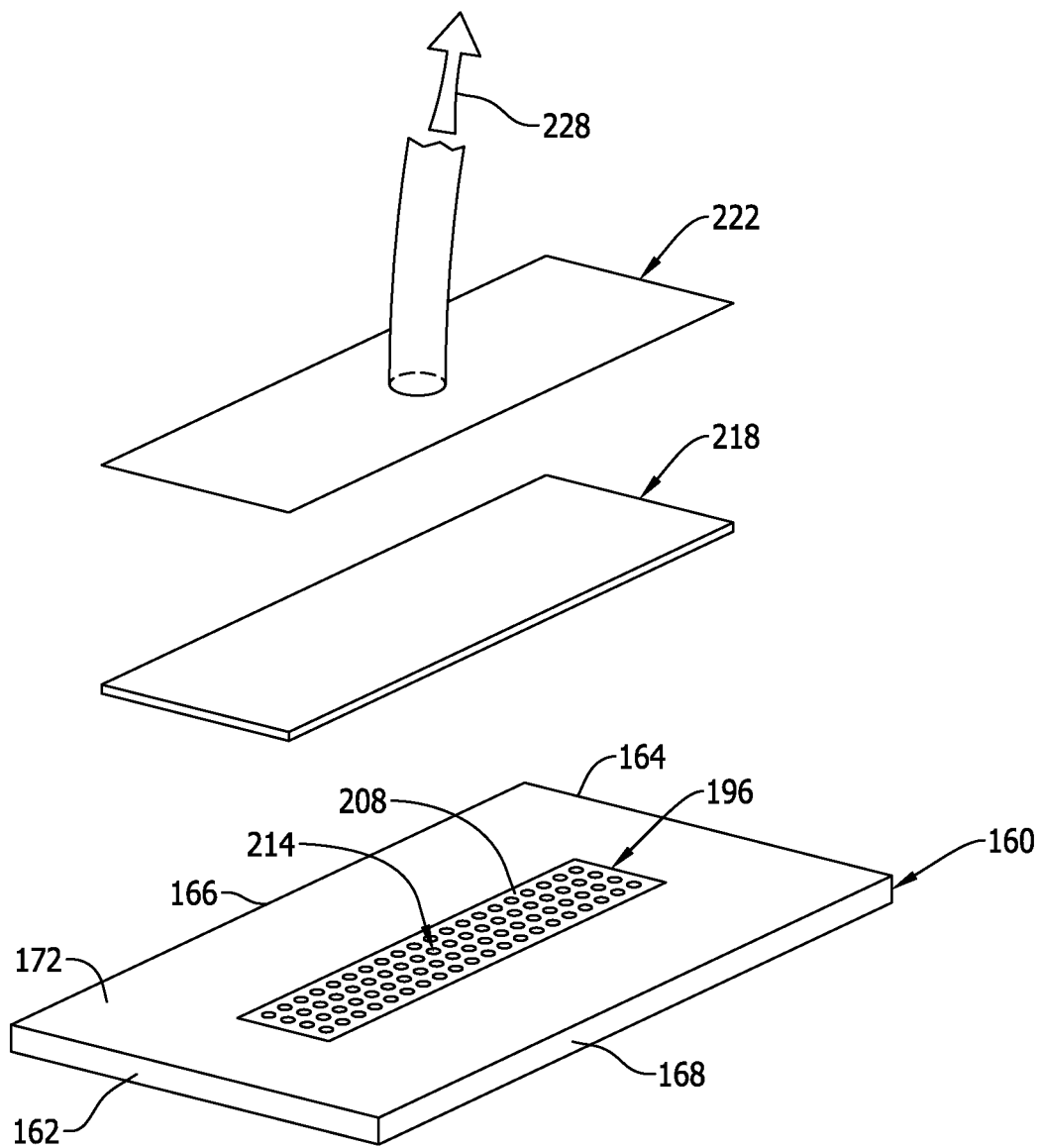
FIG. 16 is a representation of an isometric view of the tool of FIG. 15 with a plate having a plurality of perforations positioned in the channel in the tool surface and with a dry fiber composite preform and a vacuum bag positioned above the tool surface and the plate in preparing the tool of FIG. 16 for infusing liquid resin through the preform using a pressure differential.
Figure 17:
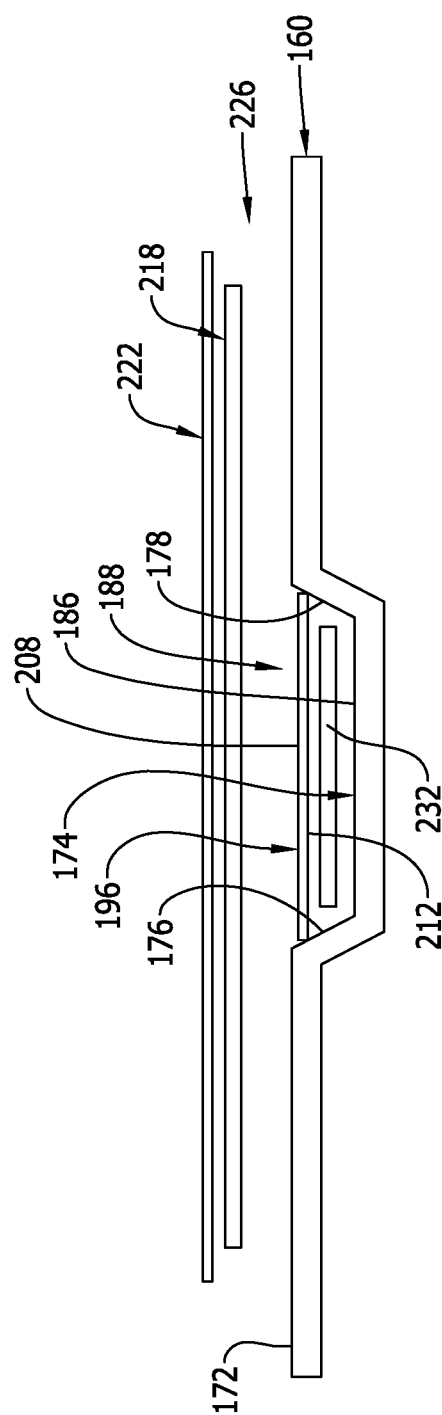
FIG. 17 is a representation of a side elevation view of the tool, the plate with the plurality of perforations, the preform and the vacuum bag of FIG. 16.

FIGS. 15-17 are representations of a further example of a tool 160 used in practicing a method of directing a flow of liquid resin through a preform. As represented in FIGS. 15-17, the tool 160 has a general rectangular configuration defined by first 162 and second 164 opposite, parallel edges and third 166 and fourth 168 opposite, parallel edges. Although the tool 160 is represented as having a rectangular configuration in FIGS. 15-17, the tool could have other equivalent configurations. The four edges 162, 164, 166, 168 of the tool 160 extend around and form a periphery of a top surface or a tool surface 172 of the tool. As represented in FIGS. 15-17, the tool surface 172 of the tool 160 has a planar surface configuration. The tool surface 172 could have various other, equivalent configurations, depending on the configuration of the composite part to be formed by the tool 160.

A channel 174 is recessed into the tool surface 172 of the tool 160. The channel 174 can be machined into the tool surface 172 or formed in the tool surface by other equivalent methods. The channel 174 is represented in FIGS. 15 and 16 as having an elongate, rectangular configuration. However, the channel 174 can have any other equivalent configuration that best suits the channel 174 for forming a composite part using the tool 160. Additionally, although only one channel 174 is represented in the tool surface 172 in FIGS. 15-17, there could be any number of channels formed in the tool surface 172 to best suit the tool surface 172 for forming a composite part. The configuration of the channel 174 represented in FIGS. 15-17 is defined by a first side wall 176 and an opposite second side wall 178 that extend along the length of the channel 174 and define a width dimension of the channel. The configuration of the channel 174 is also defined by a first end wall 182 and a second end wall 184 at opposite ends of the channel 174 that define a length dimension of the channel. The first side wall 176, the second side wall 178, the first end wall 182 and the second end wall 184 all extend downwardly into the channel 174 from the tool surface 172 to bottom surface 186 of the channel. The first side wall 176 and the second side wall 178 converge toward each other as they extend downwardly into the channel 174 and the first end wall 182 and the second end wall 184 converge toward each other as they extend downwardly into the channel 174. This gives the channel 174 a general trapezoidal cross-section configuration as represented in FIG. 17. With this cross-section configuration of the channel 174, a top opening 188 of the channel 174 in the tool surface 172 has a larger length dimension than a length dimension of the bottom surface 186 and has a larger width dimension than a width dimension of the bottom surface 186. The channel 174 could be formed with other equivalent cross-section configurations such as a v-shaped cross-section configuration, a u-shaped cross-shaped configuration, etc.

An opening or through tool port 192 is provided through the bottom surface 186 of the channel 174. The opening 192 extends through the tool 160. The opening 192 is represented as having a circular configuration, but could have other equivalent configurations. Additionally, the opening 192 is represented as being positioned at a mid-point of the length of the bottom surface 186 of the channel. The position of the opening 192 in the bottom surface 186 could be moved to other positions relative to the bottom surface 186 to best suit the opening for supplying resin to the channel 174, as will be explained. A resin supply line 194 is represented schematically as communicating with the opening 192. Resin supplied through the supply line will pass through the opening 192 and into the channel 174, and will then pass through the channel 174 to the tool surface 172.

A plate 196 is constructed to fit into the channel 174. The plate 196 has a configuration that substantially matches the configuration of the channel 174, but is slightly smaller than the configuration of the channel 174 defined by the top opening 188 of the channel. This enables the plate 196 to be removably positioned on the tool surface 172 and in the channel 174, covering over the channel 174. The configuration of the plate 196 is defined by a first side edge 198 and a second side edge 202 at opposite sides of the plate, and a first end edge 204 and a second end edge 206 at opposite ends of the plate. The first side edge 198 and the second side edge 202 of the plate 196 define a width dimension of the plate, and the first end edge 204 and the second end edge 206 of the plate define a length dimension of the plate. The plate 196 also has a thickness dimension between a top surface 208 of the plate 196 and an opposite bottom surface 212 of the plate 196. The thickness dimension of the plate 196 is smaller than the depth dimension of the channel 174 between the top opening 188 of the channel and the bottom surface 186 of the channel.

A plurality of perforations 214 pass through the plate 196 from the top surface 208 of the plate to the bottom surface 212 of the plate. The number of the perforations 214 and the area dimensions of the perforations 214 are chosen to best suit the perforations 214 to direct resin that flows from the channel 174 and through the perforations to desired areas of the tool surface 172. Thus, at least some of the plurality of perforations 214 could have different area dimensions. Additionally, the pattern of the plurality of perforations arranged through the plate 196 can be varied to best suit the perforations 214 to distributing resin to the tool surface 172 in a desired manner.

With the plate 196 having a configuration that is slightly smaller than the configuration of the channel 174 defined by the top opening 188 of the channel, and with the first side wall 176 of the channel converging toward the second side wall 178 of the channel and the first end wall 182 of the channel converging toward the second end wall 184 of the channel 174, when the plate 196 is positioned in the top opening 188 of the channel 174 it will engage against and be supported by the first side wall 176 of the channel, the second side wall 178 of the channel, the first end wall 182 of the channel and the second end wall 184 of the channel. The first side edge 198 of the plate will engage against the first side wall 176 of the channel 174, the second side edge 202 of the plate 196 will engage against the second side wall 178 of the channel 174, the first end edge 204 of the plate 196 will engage against the first end wall 182 of the channel 174, and the second end edge 206 of the plate 196 will engage against the second end wall 184 of the channel 174. The plate is supported in the channel spaced above the bottom surface 186 of the channel and with the top surface 208 of the plate substantially coplanar with the tool surface 172 of the tool 160.

FIGS. 15-17 are representations of the method of using the tool 160 in manufacturing a fiber reinforced composite part in resin infusion and resin transfer molding. In the method represented in FIGS. 15-17, the plate 196 is positioned in the top opening 188 of the channel 174. Prior to the plate 196 being positioned in the top opening 188 of the channel 174, a release agent is applied to the plate 196. The release agent will enable the plate 196 to be removed from the composite part formed by the tool 160 after the composite part has been cured. Alternatively, after the plate 196 is positioned in the top opening 188 of the channel 174, a thin sheet or film 216 having dimensions that match the dimensions of the top surface 208 of the plate 196 and having perforations that match the pattern and area dimensions of the plurality of perforations 214 of the plate 196 is positioned on the top surface 208 of the plate 196. The film 216 will prevent the plate 196 from sticking to the composite part produced by the tool 160 after the composite part has been cured.

As in the previously described methods, a dry fiber composite preform 218 is positioned over the tool surface 172 and the plate 196. In the example represented in FIGS. 15-17, the preform 218 has a configuration that closely follows the configuration of the tool surface 172. However, the preform 218 could have other configurations different from the configuration of the tool surface 172.

A fluid impervious sheet 222, or second tool or vacuum bag is then positioned on the tool surface 172. The sheet 222 covers over the preform 218. The perimeter of the sheet 222 is sealed to the tool surface 172 over the preform 218 and around the preform. As in the earlier described methods, this forms a sealed volume 226 between the sheet 222 and the tool surface 172 that is occupied by the preform 218.

A pressure differential 228 is applied to the sealed volume 226. The pressure differential 228 is represented schematically in FIGS. 15-17. As in the previously described methods, the pressure differential 228 can be introduced to the tool surface 172 and applied into the sealed volume 226 in any conventional manner. The pressure differential 228 applied to the sealed volume 226 between the fluid impervious sheet 222 and the tool surface 172 draws the fluid impervious sheet 222 down onto the preform 218.

A flow of liquid resin 232 is then supplied to the channel 174 and is drawn by the pressure differential 228 through the plurality of perforations 214 in the plate 196, into the preform 218 and across the tool surface 172. The flow of liquid resin 232 is represented schematically in FIGS. 15-17. As the flow of liquid resin 232 flows through the channel 174, through the plurality of perforations 214 in the plate 196, and across the tool surface 172, the area dimensions and the positioning of the plurality of perforations 214 in the plate 196 prevent the flow of resin over the tool surface 172 from pulling fibers from the preform 218 and prevent fibers from the preform 218 from distorting, with the perforations 214 being dimensioned small enough so that fibers from the preform 218 can bridge across the perforations 214 without bending into the perforations 214. Although the flow of liquid resin 232 is represented as being supplied to the channel 174 toward the center of the channel, the flow of liquid resin 232 could be supplied to the channel 172 at an end of the channel or at some other location around the tool surface 172.

After the composite part on the tool surface 172 has cured, the composite part is removed from the tool surface. The chemical release agent applied to the plate 196, or the film with perforations 216 that separates the plate 196 from the cured composite part enables the plate 196 and any cured resin in the channel 174 to be easily removed from the cured composite part.

Figure 18:
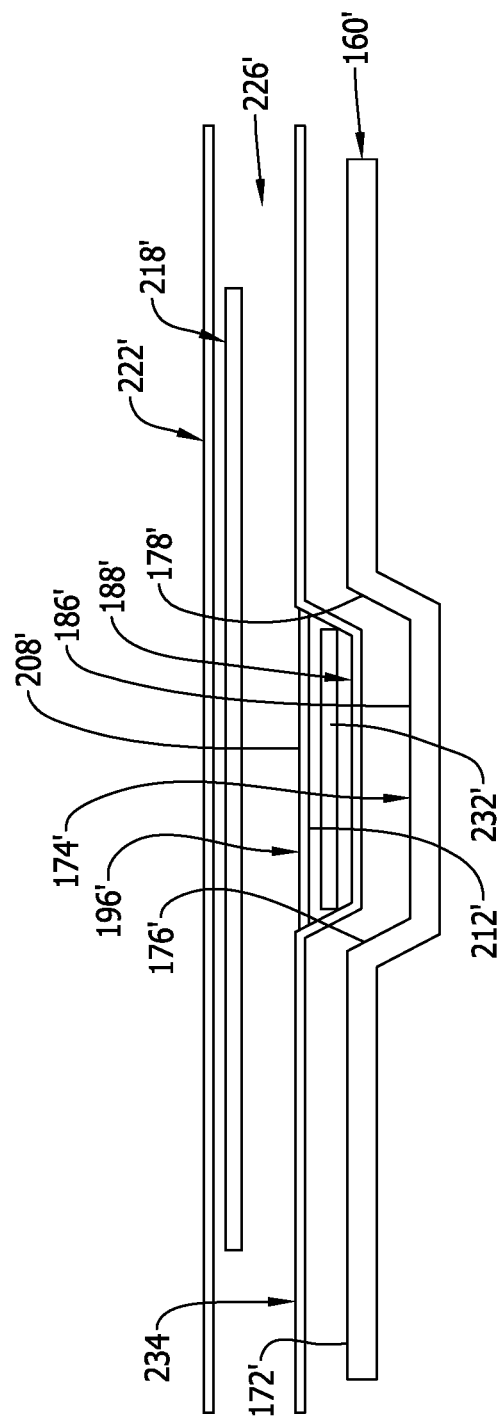
FIG. 18 is a representation of the tool, the plate with the plurality of perforations, the preform and the vacuum bag of FIG. 17, and a further liquid impervious sheet positioned on the tool surface of the tool and in the channel of the tool.

FIG. 18 is a representation of a variation of the tool surface represented in FIG. 17, with like features of the tool 160 represented in FIGS. 15-17 being labeled with their same reference numbers in FIG. 18, with the reference numbers follow by a prime ('). As represented in FIG. 18, an additional layer of film 234 is applied to the tool surface 172' prior to the flow of liquid resin 232' being introduced into the channel 174'. The further layer of film 234 enables the plate 196' and any cured resin in the channel 174' to be easily removed from the tool surface 172' after curing of the composite part formed by the tool 160'.

As various modifications could be made in the constructions of the tools and their methods of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A tool for directing a flow of liquid resin, the tool comprising:
   a tool surface on the tool;
   a channel recessed into the tool surface, the channel havinq a bottom surface;
   a plate positioned on the tool surface covering over the channel, the plate being supported by the tool in the channel with the plate spaced above the bottom surface of the channel and with a top surface of the plate positioned co-planar with the tool surface of the tool, the plate having a plurality of perforations through the plate;
   at least one of a fluid impervious sheet, a second tool and a vacuum bag on the tool surface and over the plate;
   a supply of liquid resin communicating with the tool surface; and,
   a supply of a pressure differential communicating with the tool surface.

2. The tool of claim 1, further comprising:
   a preform on the tool surface, the preform covering over the plate.

3. The tool of claim 2, further comprising:
   the plurality of perforations through the plate being configured to prevent fibers from distorting with each perforation being dimensioned to enable fibers of the preform to bridge across each perforation without bending into the perforation.

4. A tool for directing a flow of liquid resin, the tool comprising:
   a tool surface on the tool;
   a channel recessed into the tool surface;
   a plate positioned on the tool surface covering over the channel, the plate having a plurality of perforations through the plate;
   at least one of a fluid impervious sheet, a second tool and a vacuum bag on the tool surface and over the plate;
   a supply of liquid resin communicating with the tool surface;
   a supply of a pressure differential communicating with the tool surface;
   a preform on the tool surface, the preform covering over the plate;
   the channel having a length dimension and a width dimension; and,
   the plate having a length dimension and a width dimension, the length dimension of the plate extending along the length dimension of the channel and the width dimension of the plate being smaller than the width dimension of the channel.

5. The tool of claim 4, further comprising:
   the channel having opposite first and second sides on opposite sides of the width dimension of the channel; and,
   the plate having opposite first and second edges on opposite sides of the width dimension of the plate, the first and second edges of the plate engaging against the first and second sides of the channel, respectively.

6. The tool of claim 5, further comprising:
   the sides of the channel converge as they extend downward into the channel from the tool surface.

7. The tool of claim 4, further comprising:
   the channel having a top opening in the tool surface, the top opening of the channel having a width dimension; and,
   the channel having a bottom surface at a bottom of the channel, the bottom surface of the channel having a width dimension that is smaller than the width dimension of the top opening of the channel.

8. The tool of claim 7, further comprising:
   the channel having a depth dimension between the top opening of the channel and the bottom surface of the channel; and,
   the plate having a thickness dimension between a top surface of the plate and an opposite bottom surface of the plate, the thickness dimension of the plate being smaller than the depth dimension of the channel.

9. The tool of claim 4, further comprising:
at least some of the plurality of perforations through the plate having different area dimensions.

10. A tool for directing a flow of liquid resin through a preform, the tool comprising:
a tool surface on the tool;
a channel recessed into the tool surface, the channel having a bottom surface;
a plate positioned on the tool surface in the channel, the plate being supported by the tool in the channel with the plate spaged above the bottom surface of the channel and with a top surface of the plate positioned co-planar with the tool surface of the tool the plate having a plurality of perforations through the plate;
a preform on the tool surface, the preform covering over the plate and the plurality of perforations through the plate;
at least one of a fluid impervious sheet, a second tool, and a vacuum bag sealed to the tool surface and covering over the preform and the plate;
a supply of liquid resin communicating with the tool surface; and,
a supply of a pressure differential communicating with the tool surface, the supply of the pressure differential being operable when supplied to the tool surface to draw a flow of liquid resin into the channel from the supply of liquid resin and through the channel in the tool surface and through the plurality of perforations through the plate where the channel directs the flow of liquid resin to discrete areas on the tool surface and through the plurality of perforations through the plate and through the preform.

11. The tool of claim 10, further comprising:
the plurality of perforations through the plate having areas dimensioned to prevent fibers from distorting with each perforation being dimensioned to enable fibers of the preform to bridge across each perforation without bending into the perforation.

12. The tool of claim 10, further comprising:
at least some of the plurality of perforations through the plate having different area dimensions.

13. A tool for directing a flow of liquid resin through a preform, the tool comprising:
a tool surface on the tool;
a channel recessed into the tool surface;
a plate positioned on the tool surface in the channel, the plate having a plurality of perforations through the plate;
a preform on the tool surface, the preform covering over the plate and the plurality of perforations through the plate;
at least one of a fluid impervious sheet, a second tool, and a vacuum bag sealed to the tool surface and covering over the preform and the plate;
a supply of liquid resin communicating with the tool surface;
a supply of a pressure differential communicating with the tool surface, the supply of the pressure differential being operable when supplied to the tool surface to draw a flow of liquid resin into the channel from the supply of liquid resin and through the channel in the tool surface and through the plurality of perforations through the plate where the channel directs the flow of liquid resin to discrete areas on the tool surface and through the plurality of perforations through the plate and through the preform;
the channel having a width dimension; and,
the plate having a width dimension, the width dimension of the plate being smaller than the width dimension of the channel.

14. The tool of claim 13, further comprising:
the channel having a first side wall and a second side wall at opposite sides of the width dimension of the channel; and,
the plate having a first side edge and a second side edge at opposite sides of the width dimension of the plate, the first side edge of the plate engages against the first side wall of the channel and the second side edge of the plate engages against the second side wall of the panel.

15. The tool of claim 14, further comprising:
the first side wall of the channel and the second side wall of the channel converge as the first side wall of the channel and the second side wall of the channel extend into the channel from the tool surface.

16. The tool of claim 13, further comprising:
the channel having a top opening in the tool surface, the top opening of the channel extending across the tool surface and defining a length dimension of the channel and the width dimension of the channel; and,
the channel having a bottom surface at a bottom of the channel, the bottom surface extending along the length dimension of the channel, the bottom surface having a width dimension that is smaller than the width dimension of the top opening of the channel.

17. The tool of claim 13, further comprising:
the channel having a top opening in the tool surface;
the channel having a bottom surface at the bottom of the channel;
the channel having a depth dimension between the top opening of the channel and the bottom surface of the channel; and,
the plate having thickness dimension between a top surface of the plate and an opposite bottom surface of the plate, the thickness dimension of the plate being smaller than the depth dimension of the channel.

18. A method of directing a flow of liquid resin through a preform, the method comprising:
positioning a plate over a channel in a tool surface of a tool, the plate having a plurality of perforations through the plate;
supporting the plate by the tool in the channel with the plate spaced above a bottom surface of the channel and with a top surface of the plate positioned co-planar with the tool surface of the tool;
positioning a preform on the plate with the preform covering over the plurality of perforations through the plate;
positioning at least one of a fluid impervious sheet, a second tool, and a vacuum bag on the tool surface over the preform;
sealing at least one of the fluid impervious sheet, the second tool and the vacuum bag on the tool surface over the preform forming a sealed volume between the at least one of the fluid impervious sheet, the second tool and the vacuum bag;
supplying a pressure differential into the sealed volume;
supplying a flow of liquid resin into the sealed volume; and,
directing the flow of liquid resin supplied into the sealed volume through the channel in the tool surface, through the plurality of perforations in the plate over the channel and through the preform by the pressure differential pulling the flow of liquid resin through the channel, through the plurality of perforations and into the preform.

19. The method of claim 18, further comprising:

curing the liquid resin in the preform and thereby forming a composite part; and, removing the plate with the plurality of perforations from the composite part.

20. The method of claim 19, further comprising:

applying a release agent to the plate prior to positioning the plate over the channel.

\* \* \* \* \*

UNITED STATES PATENT AND TRADEMARK OFFICE
CERTIFICATE OF CORRECTION

PATENT NO. : 10,807,324 B2
APPLICATION NO. : 16/054106
DATED : October 20, 2020
INVENTOR(S) : Paul D. Evans and Max M. Osborne It is certified that error appears in the above-identified patent and that said Letters Patent is hereby corrected as shown below:

In the Claims

Column 13, Lines 11 and 13, In Claim 10, in Line 8, "spaged" is replaced with --spaced--, and in Line 10, "tool the" is changed to --tool, the--.

Signed and Sealed this
First Day of December, 2020

Andrei Iancu
*Director of the United States Patent and Trademark Office*